(12) United States Patent  
Arai

(10) Patent No.: US 9,333,900 B2  
(45) Date of Patent: May 10, 2016

(54) APPARATUS FOR GENERATING HIGH CONTRAST OPTICAL SIGNALS, AND EXEMPLARY APPLICATIONS

(71) Applicant: IMRA AMERICA, INC., Ann Arbor, MI (US)

(72) Inventor: Alan Y. Arai, Fremont, CA (US)

(73) Assignee: IMRA AMERICA, INC., Ann Arbor, MI (US)

( * ) Notice: Subject to any disclaimer, the term of this patent is extended or adjusted under 35 U.S.C. 154(b) by 436 days.

(21) Appl. No.: 13/648,484

(22) Filed: Oct. 10, 2012

(65) Prior Publication Data

US 2013/0093581 A1     Apr. 18, 2013

Related U.S. Application Data

(60) Provisional application No. 61/546,295, filed on Oct. 12, 2011.

(51) Int. Cl.  
*B60Q 1/00* (2006.01)  
*B60Q 1/26* (2006.01)  
(Continued)

(52) U.S. Cl.  
CPC ............... *B60Q 1/00* (2013.01); *B60R 1/1207* (2013.01); *B60R 2001/1215* (2013.01); *G09G 2380/06* (2013.01); *G09G 2380/10* (2013.01)

(58) Field of Classification Search  
CPC .............. B60Q 1/26; B60Q 1/00; B60R 1/12  
USPC ........................................................ 340/435  
See application file for complete search history.

(56) References Cited

U.S. PATENT DOCUMENTS 4,882,565 A * 11/1989 Gallmeyer ............. B60Q 3/001  
340/461  
4,906,085 A    3/1990 Sugihara  
(Continued)

FOREIGN PATENT DOCUMENTS

CN     2506492 Y     8/2002  
WO   2006124682 A2   11/2006

OTHER PUBLICATIONS

Automotive Engineering International, Sep. 20, 2011, pp. 12-17, "Advancing optical films" (adapted from Bastawros et al.).  
(Continued)

*Primary Examiner* — Jennifer Mehmood  
*Assistant Examiner* — John Mortell  
(74) *Attorney, Agent, or Firm* — Sughrue Mion, PLLC; Richard C. Turner

(57) ABSTRACT

A display apparatus generates a high visibility optical signal, such as an ICON, the ICON comprising a symbol, shape, or other image-like representation. The ICON becomes visible at an observation point during an illumination ON-state. The ICON may be formed as a portion of display medium, for example as a machined portion of a mirror capable of forming images of a scene by reflection in normal operation. The visibility of the ICON in the illumination OFF-state from an observation point is sufficiently low such that the normal operation of the display medium is maintained. The display apparatus may be used in a blind spot warning system for a vehicle. Visible wavelength LEDs, RGB LEDs and/or diode lasers may be utilized as an illumination source. Ultrashort laser processing or other methods for material modification may be utilized to form microscopic features which distribute incident light, increasing the visibility of the optical signal at an observation point in an ON-state, with very low visibility in the OFF-state and minimal effect on the image in the display medium in the OFF state.

32 Claims, 9 Drawing Sheets

(51) Int. Cl.
*G02F 1/153* (2006.01)
*B60R 1/12* (2006.01)

(56) References Cited

U.S. PATENT DOCUMENTS

| | | | |
|---|---|---|---|
| 5,313,335 | A | 5/1994 | Gray |
| 5,481,409 | A | 1/1996 | Roberts |
| 5,656,186 | A | 8/1997 | Mourou |
| 6,281,471 | B1 | 8/2001 | Smart |
| 7,008,091 | B2 | 3/2006 | Mathieu |
| 7,626,749 | B2 | 12/2009 | Baur |
| 7,663,612 | B2 | 2/2010 | Bladt |
| 7,968,820 | B2 | 6/2011 | Hardy |
| 7,976,764 | B2 | 7/2011 | Schlemmer |
| 8,081,430 | B2 | 12/2011 | Weber |
| 8,405,885 | B2 | 3/2013 | Shah |
| 8,503,062 | B2 | 8/2013 | Baur |
| 8,654,433 | B2 | 2/2014 | Baur |
| 2005/0226287 | A1 | 10/2005 | Shah et al. |
| 2007/0051706 | A1 | 3/2007 | Bovatsek |
| 2008/0212189 | A1 | 9/2008 | Baur |
| 2008/0218871 | A1 | 9/2008 | Todd |
| 2009/0080055 | A1 | 3/2009 | Baur |
| 2009/0115631 | A1 | 5/2009 | Foote |
| 2009/0268265 | A1 | 10/2009 | Shah |
| 2009/0316422 | A1* | 12/2009 | Lynam ............... B60Q 1/2665 362/494 |
| 2010/0025387 | A1 | 2/2010 | Arai |
| 2010/0026475 | A1 | 2/2010 | Hwang |
| 2010/0066519 | A1 | 3/2010 | Baur |
| 2010/0197116 | A1 | 8/2010 | Shah |
| 2011/0102167 | A1 | 5/2011 | Baur |
| 2011/0122560 | A1 | 5/2011 | Andre |
| 2011/0147620 | A1 | 6/2011 | Arai |
| 2012/0033285 | A1* | 2/2012 | Baumann ............ B60R 1/088 359/267 |
| 2012/0320444 | A1 | 12/2012 | Baur |
| 2013/0183837 | A1 | 7/2013 | Arai et al. |
| 2013/0314760 | A1 | 11/2013 | Baur |
| 2014/0192520 | A1 | 7/2014 | Baur |

OTHER PUBLICATIONS

Mazda Motor Company, www.mazdausa.com/MusaWeb/displayPage.action?pageParameter=modelsMain&vehicleCode=CX9#/videos/safety, downloaded Nov. 7, 2011.
Ford Motor Company, http://www.ford.com/technology, downloaded Nov. 7, 2011.
Muth Mirror Systems, http://www.muthco.com, downloaded Nov. 7, 2011.
Cadillac Motor Company, http://www.cadillac.com/2011-escalade-suv/exterior-photos.html#item04, downloaded Nov. 7, 2011.
Acura Motors Corp., Acura Blind Spot Technology, www.acura.com/Features.aspx?model=MDX&modelYear=2011&context=Exterior#blind_spot_information_system; http://www.youtube.com/watch?v=5Te-WiRohR8, downloaded Nov. 7, 2011.
Volvo Corporation, Volvo Blind Spot Technology, http://www.gizmag.com/go/2937, downloaded Nov. 7, 2011.
Volvo Corporation, Volvo Brochure, http://www.volvocars.com/us/sales-services/sales/Documents/Volvo-MY12-XC70-Brochure.pdf; downloaded Nov. 8, 2011.
SmartMotorist, Advanced System Blind Spot Mirror, http://www.smartmotorist.com/motorist-news/advanced-system-to-adjust-blind-spot-mirror.html, downloaded Nov. 8, 2011.
Wikipedia, free Encyclopedia, http://en.Wikipedia.org/wiki/Eye, downloaded Nov. 8, 2011.
PCT search report (PCT/US2012059466) issued Jan. 2, 2013.
Chinese App # 201280045642.2 Office Action issued Apr. 3, 2015 (F209959-288CN).

* cited by examiner

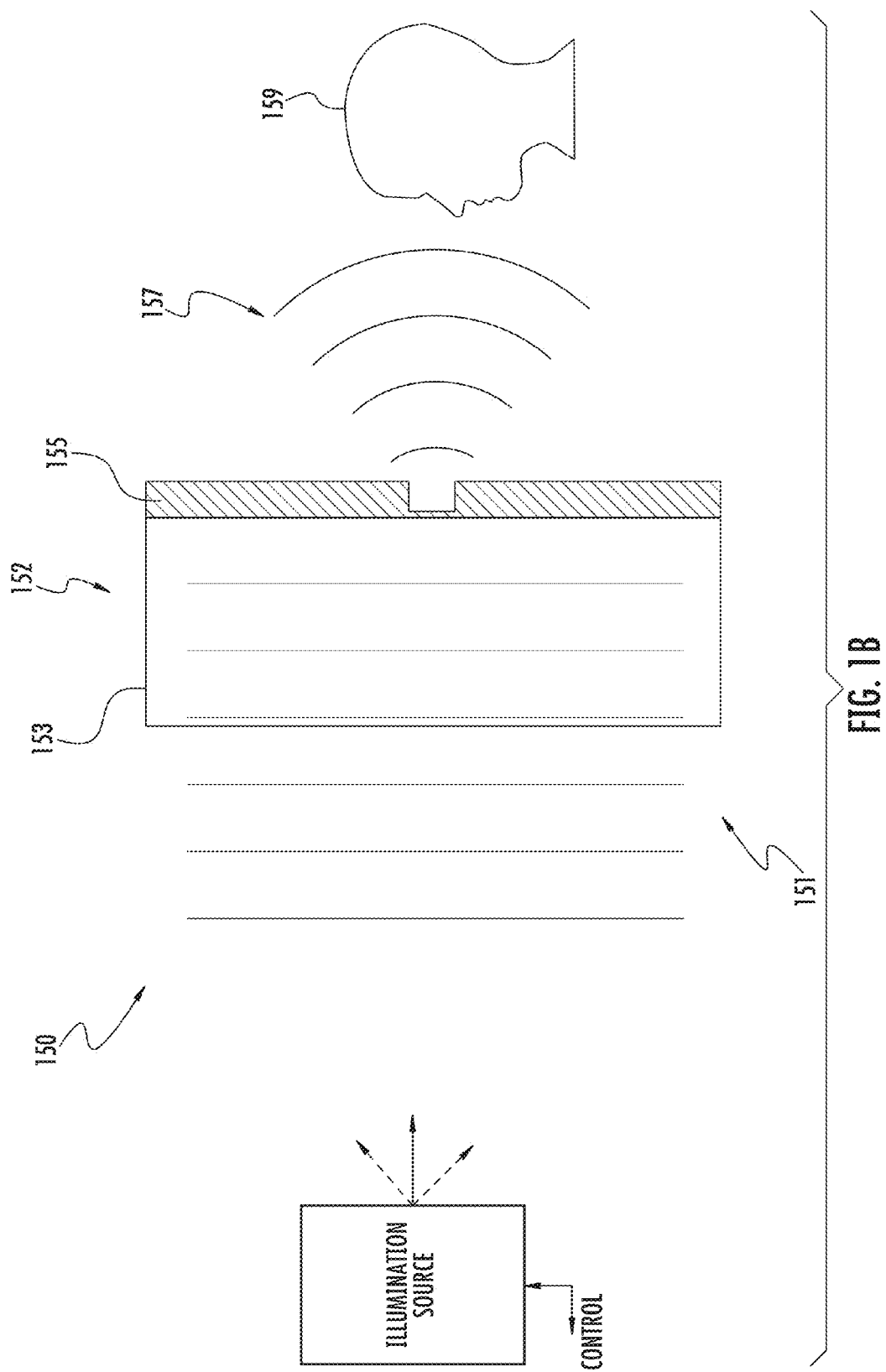

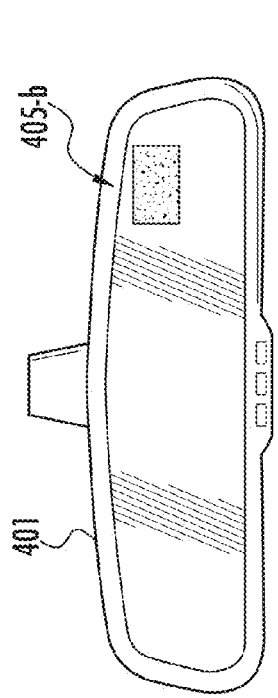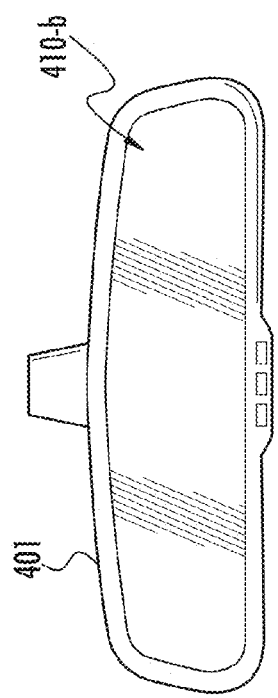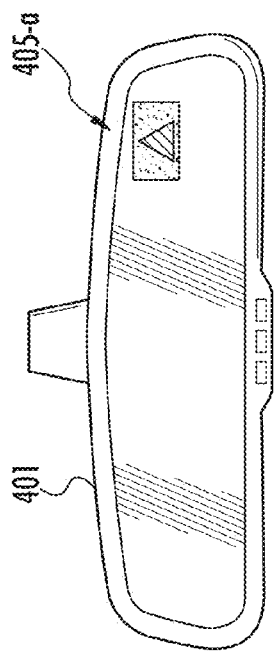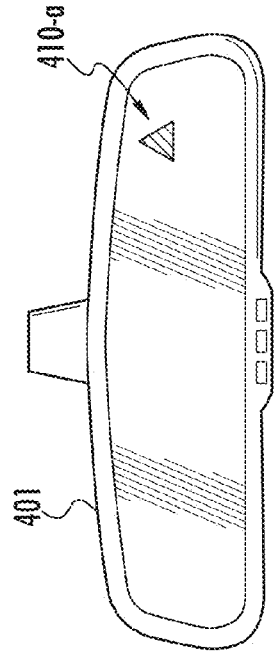
FIG. 4A
FIG. 4B

APPARATUS FOR GENERATING HIGH CONTRAST OPTICAL SIGNALS, AND EXEMPLARY APPLICATIONS

FIELD OF THE INVENTION

This invention relates to devices, methods, and systems for the generation and display of high contrast optical signals, and more particularly to visual indicators for applications in warning systems. By way of example, the devices may be utilized in blind spot warning systems or similar indicators in vehicles.

BACKGROUND OF THE INVENTION

Blind spot warning systems in vehicles may selectively display a graphic representation (ICON) as an indicator of a particular condition of operation. For example, a highly visible optical signal may be generated in a rearview mirror to indicate the presence of a vehicle in a blind spot, or other hazardous condition. Further, turn signal indicators in mirrors, or in the vicinity of mirrors, have been utilized for several years in vehicles. In some systems a warning signal is generated in such a way that the visible light is not in the rearview mirror, but in the interior of the vehicle, for example in the pillar or other location in general proximity to the mirror.

Human factors and ergonomic considerations provide some motivation for the design of blind spot and other warning systems. Also, enhanced warning systems can improve overall vehicle functionality, increase safety, and provide ease of use.

Technology advances in imaging and sensor technology have stimulated developments of improved warning systems. CCD cameras mounted on the car and on-board video image processing have been demonstrated. The field of view of a blind spot monitoring system need not be restricted to the vehicle's blind spot, but can also cover adjacent regions. The warning to the driver from the system can be any combination of visual, audible and/or tactile signals.

Existing blind spot warning displays generate a highly visible optical signal when a hazard is detected but can also impair visibility of the scene in the OFF-state (no hazard detected). Ideally, when in the OFF-state only the scene, viewed as a reflected image in the mirror (e.g.: a mirror image), should be visible. The ICON and any structure associated therewith should not impair visibility of such a mirror image. However, the structure of a conventional blind spot warning system ICON can cause reduced reflectance, light scattering, multiple reflections, ghost images, or similar optical phenomena. For example, in various designs the ICON, and the corresponding indicator region about the ICON, may be less reflective than the rest of the mirror.

Some existing blind spot warning indicators use an LED array to form an ICON, the array being mounted behind the mirror. The reflective coating of the mirror is removed from the region around the ICON to pass the optical signal radiation from the LED array. Thus, the effective mirror area is reduced and the indicator structure obscures any image that might be in or around the ICON region. Thus, when used in a rearview mirror, the visibility when in the OFF condition presents some limitations, including a viewing tradeoff.

Additionally, tradeoff(s) exist between the size and/or number of ICONs. A large ICON can further reduce the useful viewing area of the mirror, effectively introducing a blind spot in the mirror. Thus, the ICON area is often constrained. The ICONs in the mirrors of conventional blind spot warning systems are also relatively small and placed along the edges of the mirror in order to avoid obstructing the image of any object to the side of the vehicle. Notably, objects in the vehicle's blind spot are, by definition, not visible in the mirror. Such limits on the available locations and the small size can make ICONs more difficult to see and interpret. Furthermore, in some implementations multiple ICONs could be beneficial, but shape discrimination can be limited by the small size of the ICONs selected to reduce the obstructed area of the mirror. ICON locations are generally restricted to regions of the mirror that are not expected to show important information. However, it is still possible that useful and important information may be projected in this obstructed part of the mirror.

Information regarding vehicle warning technologies is readily available from several manufacturers, such as brochures or web-based videos. For example:
www.mazdausa.com/MusaWeb/displayPage.ac-
tion?pageParameter=
modelsMain&vehicleCode=CX9#/videos/safety;
http://www.ford.com/technology/;http://www.muthco.com/;
http://www.cadillac.com/2011-escalade-suv/exterior-
photos.html#item04;
www.acura.com/
Features.aspx?model=MDX&modelYear=2011&context=
Exterior#blind_spot_information_system; http://www.you-
tube.com/watch?v=5Te-WiRohR8; http://www.gizmag-
.com/go/2937/; http://www.volvocars.com/us/sales-ser-
vices/sales/DocumentsNolvo-MY12-XC70-Brochure.pdf;
http://www.smartmotorist.com/motorist-news/advanced-
system-to-adjust-blind-spot-mirror.html U.S. Pat. No. 7,008,091, entitled "Electromagnetic radiation assembly", and U.S. Patent Application Pub. No. 2008/0218871 entitled "Mirror assembly" relate, among other things, to rearview mirror based warning systems for use in vehicles. Automotive Engineering International, Sep. 20, 2011, pgs. 12-17, "Advancing optical films" (adapted from Bastawros et al.) discloses and compares various display technologies with potential use in automotive displays, including polycarbonate films with engineered microlens surface structures to control illumination uniformity.

SUMMARY OF THE INVENTION

For purposes of summarizing the present invention, certain aspects, objects, advantages and novel features of the present invention are described herein. It is to be understood, however, that not necessarily all such objects or advantages may be achieved in accordance with any particular embodiment. Thus, the present invention may be embodied or carried out in a manner that achieves one or more objects or advantages without necessarily achieving other objects or advantages as may be taught or suggested herein.

An object of the present invention is to provide a display apparatus that generates a high visibility optical signal, such as in the form of an ICON, the ICON comprising a symbol, shape, or other image-like representation. The ICON becomes visible at an observation point during an illumination ON-state. The ICON may be formed in a portion of a display medium, for example as a machined portion of a mirror capable of forming images of a scene by reflection in normal operation in the OFF-state. The visibility of the ICON in the OFF-state, as seen from an observation location corresponding with normal viewing conditions, is sufficiently low such that the normal performance or function of the display medium is maintained.

An object of the present invention is to provide an in-mirror blind spot warning signal for a vehicle. In an ON-state an ICON is highly visible to an operator. In the OFF-state the ICON is nearly invisible. The normal viewing area of the mirror is available during the OFF-state, and the blind spot warning system does not impair visibility of images reflected in the mirror when in the OFF-state.

An object of the invention is to increase the available size and/or number of ICONs in a display medium which can be individually viewed in the selected ICON ON-states, while maintaining the functionality of the display medium when the ICONs are in the OFF-state.

An object of the invention is to provide a display apparatus suitable for signaling applications other than warning indicators, and may be utilized to display ICONs at specific instances and to render the ICONs substantially invisible at other times. Moreover, a display apparatus may comprise a non-mirror medium, for example a transparent or translucent substrate with a thin, opaque or semi-opaque film.

In various implementations suitable sensors may be deployed about a vehicle to monitor various conditions, and to generate a visual or other indicator therefrom for a vehicle operator and/or passenger. A visible signal, for example an illuminated symbol or ICON, may be displayed using a partially reflective medium. The symbol or ICON is to be substantially invisible in the illumination OFF-state.

Embodiments of the present invention may be utilized for various types of driver warnings or indicators in mirrors, such as blind spot warnings or turn signals, and may be implemented in driver side, passenger side, rearview mirrors, other car mirrors, or in media suitable for signal monitoring and/or detection. Highly visible warning ICONs are provided for the driver with no substantial reduction or degradation of the mirror area used for showing reflected images of the scene.

At least one embodiment of an optical signaling apparatus includes a controllable first source of illumination capable of providing ON and OFF illumination states. An optical medium is arranged to receive illumination from the controllable first source and is capable of receiving illumination from a second source. A region of the medium is arranged in such a way that a detectable optical signal is visible therefrom during an illumination ON state of the controllable first source. The region of the medium is essentially indistinguishable from other parts of the medium during an OFF illumination state of said controllable first source, notwithstanding the arrangement of the region.

At least one embodiment includes a laser-based method. The method includes irradiating a portion of an optical medium with laser pulses to selectively remove at least a depth-wise portion of material from a region of the medium, and to form a predetermined pattern of microscopic features. The microscopic features are arranged in such a way that a detectable optical signal is visible therefrom with illumination from a first source. For purposes of the invention, "microscopic" is defined as a feature size (e.g.: line width) in the range from about 0.5 µm to about 100 µm. The medium is capable of receiving incident illumination from a second source. The region of the medium is essentially indistinguishable from other parts of the medium without illumination from the first source, notwithstanding the arrangement of the region.

At least one embodiment includes modifying a region of an optical medium to selectively remove at least a depth-wise portion of material from the region of the medium, and to form a predetermined pattern of microscopic features. The features are arranged in such a way that a detectable optical signal is visible therefrom with illumination from a first source. The medium is capable of receiving illumination from a second source. The region of the medium is essentially indistinguishable from other parts of the medium, notwithstanding the arrangement of the region.

At least one embodiment includes an optical signaling method. The method includes controlling a first source of illumination capable of providing ON and OFF illumination states. The method includes utilizing an optical medium to receive illumination from the first source and to receive illumination from a second source. A region of the medium is arranged in such a way that a detectable optical signal is visible therefrom during an illumination ON state of the first source. The region of the medium is essentially indistinguishable from other parts of the medium during an OFF illumination state of the first source, notwithstanding the arrangement of the region.

At least one embodiment includes an optical signaling apparatus. The apparatus includes a controllable source of illumination capable of providing ON and OFF illumination states. An optical medium is capable of providing an image when the illumination is in an OFF-state. A region of the optical medium is arranged in such a way that a detectable optical signal is observable therefrom when illumination is in an ON-state. The features that produce the optical signal are essentially invisible when illumination is in an OFF-state.

At least one embodiment of a blind spot warning system includes an optical medium, for example a mirror having a reflective surface. The mirror reflective surface comprises at least one machined feature that forms a portion of an indicator. The feature(s) are formed so as to generate highly visible signal radiation when illuminated with a controlled source, corresponding to an ON-state. In the OFF-state, the indicator essentially operates as a portion of the mirror, and the presence of the machined feature(s) does not impair visibility of the images reflected in the mirror.

In some embodiments a mirror comprises a reflective coating disposed on a transparent substrate. The features may be formed by selectively removing portions of the reflective coating.

In some embodiments the controlled source of radiation may include visible wavelength LEDs, and may include RGB LEDs or diode laser configurations, for example.

In some embodiments a controlled illumination source is disposed to pass energy from the source through the transparent substrate so as to impinge the indicator region and machined features therein.

In some embodiments an illumination level may be adjustable over a substantial portion of the available light range, and a controlled source of illumination may be configured for automatic light control, such as in response to the ambient light level, and to set levels for ON and/or OFF states.

In some embodiments the machined features may be sufficiently narrow to diffract energy from the controlled source in such a way as to enhance visibility of the indicator region in an ON-state at a viewing position.

In some embodiments an ICON can be placed anywhere on the mirror.

When utilized in vehicles an ICON is invisible to the driver when the Warning is OFF, providing a non-obscured, full mirror view for the driver.

In some embodiments a diffuser may be disposed between the controlled source and the machined features to improve uniformity of the illumination.

Feature dimensions may be in the range from about 0.5 µm to 100 µm, and the width may be constant or varying.

In some embodiments a feature dimension may be based on a limit of resolution or detectability of an observer or imaging device at a pre-determined observation location.

The machined features of the indicator region may be in the form of dots, lines, arcs, circles, or other suitable shapes so as to form a suitable viewing pattern when illuminated in an ON-state.

The coated mirror may be partially reflective or highly reflective.

The reflective surface of the mirror, or a depthwise portion thereof, can be machined without producing melt or oxidization, resulting in a minimal mark width that is nearly invisible under normal viewing conditions. Varying the depth and/or width can be used to provide additional visual effects, such as gray-scale and intensity variation of the optical signal across an ICON in an ON-state while the ICON is invisible or nearly invisible in the OFF-state.

BRIEF DESCRIPTION OF THE DRAWINGS

FIG. 1B schematically illustrates a portion of a display apparatus according an embodiment of the present invention which provides for high visibility of ICONs when in an ON-state, and low visibility of machined marks used to form the ICONs when in the OFF-state.

FIG. 4A schematically illustrates, under normal viewing conditions, the appearance of a prior rearview mirror indicator region with illumination in ON and OFF states. A portion of the mirror surface is removed from the region containing the ICON.

FIG. 4B illustrates the appearance of the mirror region in ON and OFF states with the use of a display apparatus according to an embodiment of the present invention.

DETAILED DESCRIPTION

For the purpose of illustrating various embodiments, terms herein are to be construed as flexible and with ordinary meaning unless otherwise stated. For example, the term "illumination" is not limited to radiant energy in the visible portion of the spectrum, and may include UV, near-far IR, or other wavelengths. An "optical signal" is not limited to visible wavelengths of the electromagnetic spectrum. Similarly, although at least one warning system application considers detection by the human eye at a typical viewing distance, it is to be recognized "detection", "visibility", or "invisibility" is not so limited and such conditions may be obtained with the use of imaging devices, pattern recognition algorithms, and the like as pertains to nominal viewing conditions and arrangements for various applications.

Figure 1A:
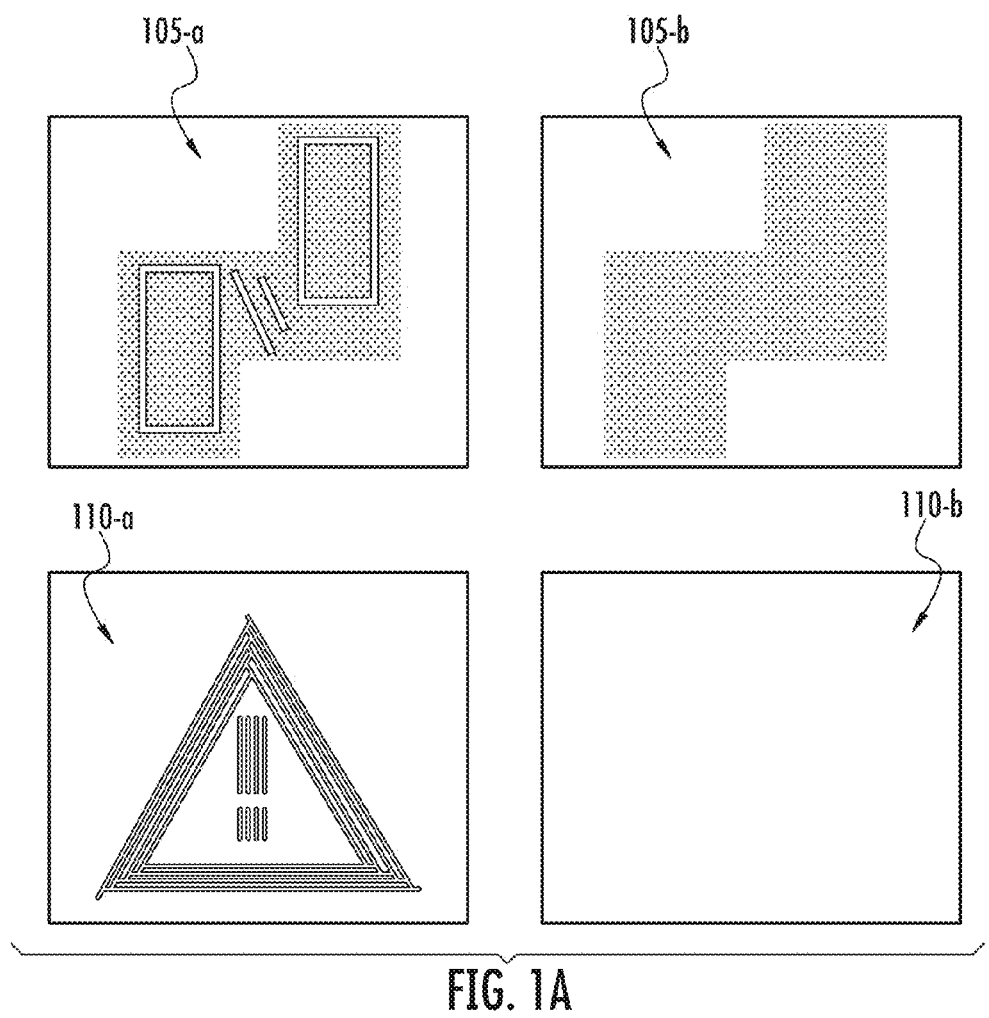
FIG. 1A schematically illustrates, in expanded views, the appearance of an exemplary conventional blind spot warning indicator in ON and OFF states, and the corresponding appearance of a blind spot warning indicator according to an embodiment of the present invention.

FIG. 1A schematically illustrates expanded views of a conventional blind spot indicator in ON and OFF states and, for comparison, and corresponding views of a blind spot indicator according to one embodiment of the present invention. The blind spot indicator may include an ICON comprising a symbol, shape, or other image-like representation when illuminated with a first controlled source of illumination. The regions shown in the close up view of FIG. 1A may correspond to a small fraction of a mirror area. The ICON is activated to provide a detectable optical signal when in an ON-state. In this example the mirror can be assumed to be uniformly illuminated over the reflective surface area, including the regions shown in FIG. 1A, without any objects forming reflected images.

An exemplary ICON of a prior system is illustrated in the ON and OFF states, 105-*a* and 105-*b*, respectively. The physical structure of the conventional ICON, which may include portions of the optical, electrical, and/or mechanical assemblies, can alter the optical properties of the corresponding portion of the mirror surface, thereby creating the visible background 105-*b*. Thus, the ICON, including the background region associated therewith, may be visible in the OFF-state, and may degrade any normal mirror image or possibly render the corresponding region of the mirror non-useable.

In contradistinction to the prior systems, embodiments of the present invention can provide for high visibility of the ICON in the ON-state 110-*a*, and negligible visibility of the ICON in the OFF-state 110-*b*. The functionality of the mirror or other optical medium is maintained in the OFF-state.

In at least one embodiment of a display apparatus of the present invention an optical medium is arranged to receive incident radiant energy from a second source and capable of providing an image therewith during an OFF illumination state of the first source. The radiant energy may originate from a second source of natural or artificial illumination (or a combination of both), and a source of radiant energy may not necessarily be provided as a portion the display apparatus as will be discussed below. The optical medium is further arranged to receive illumination from a controllable source of illumination. A region of the optical medium is arranged to distribute energy received from the controllable source in such a way that a detectable optical signal is observable therefrom during an ON-state. This region of the optical medium provides a portion of the image during the OFF-state, notwithstanding the arrangement of said region.

The controllable first source of illumination provides for visibility of an ICON when the illumination is in an ON state. In an OFF state the ICON is essentially invisible, notwithstanding the presence of illumination from a second source on or within the region of the optical medium. The radiant energy from a second source may originate from a natural or artificial source of illumination other than the first source, but does not necessarily exclude radiation from the first source. Illumination from the second source is to provide visibility of the medium for an intended end-user application, but the ICON is to be visible with illumination from the first controllable source. For example, in an application for a mirror-based warning system for an automobile, the second source of radiant energy may include sunlight or scattered ambient light, and may comprise direct illumination or originate from multiple reflections. In some applications, for example viewing under low-light conditions, the second source of radiant energy may be emitted from headlights, moonlight, streetlights, or other sources in the environment external to the automobile or the ICON display apparatus. In some applications of display technology, the second source of radiant energy may be generated with the display or from ambient light interacting therewith, while the ICON remains invisible. In various embodiments image fidelity over the entire active imaging area of the optical medium is achieved during an OFF-state of the controllable first source, including the region of the medium from which the optical signal is observable.

FIG. 1B schematically illustrates a portion 150 of a display apparatus according to an embodiment of the present invention. The apparatus provides for high visibility of ICONs when in an ON-state, and low visibility of the microscopic marks used to form the ICON when in the OFF-state. The system includes a controllable first source of illumination, and a mirror 152 having a microscopic feature therein (a single feature of which is illustrated in FIG. 1B). In some embodiments the mirror 152 comprises a reflective coating 155 disposed on a transparent substrate 153; one such feature is shown at the center of mirror 152. The features may be formed by selectively removing portions of the reflective coating 155. In some implementations a depthwise portion of the reflective coating 155 may remain after machining, as illustrated in FIG. 1B. In this way modification of the transparent substrate 153 can be avoided. In the example of FIG. 1B the mirror comprises the optical medium and the region of microscopic marks is to provide the detectable optical image during an ON-state of active illumination. To display a signal, for example to show a warning ICON, the controlled source of illumination is turned ON and generates active illumination depicted by incident beam 151. The source may be an LED that emits visible light over a wide angle. Incident beam 151 is depicted as a plane wave, but illumination incident upon the microscopic features may be over a wide range of angles. In some embodiments a diffuser may be included in the arrangement (not shown) to increase illumination uniformity, and is beneficial for removal of any light source images (e.g.: images of LED). The diffuser may comprise a standard ground glass plate or, in some embodiments, a microlens (ML) array. The light passes through the microscopic feature and the resulting angular spread 157 of illumination causes the feature to appear to be much larger and increases observer 159 visibility. The energy may be distributed over a range of angles through diffraction of light by the microscopic features, and decreased size of microscopic features relative to the source wavelength(s) will further increase the angular spread. Light scattering, light diffusion, and other optical phenomena may also be exploited to distribute the energy for viewing. Microscopic features may be arranged in a regular pattern of lines, a random pattern, or any suitable arrangement. Light that does not pass through the microscopic feature is blocked or substantially attenuated.

In a preferred implementation the microscopic features are essentially invisible when the illumination is in the OFF-state. In the OFF-state, low visibility is caused, at least in part, by the narrow linewidth and/or sparse density of the marks, which may be below the resolution limit of a natural or artificial imaging system at a point of observation. For example, in an automotive system a rearview mirror may be at least about 20 cm from the driver. The microscopic features are not visible to the unaided eye. However, when examining the mirror at close range, or with magnification, it may be possible to see the microscopic pattern under suitable illumination conditions (e.g.: as illustrated in FIG. 1A). However, in a preferred implementation and operation, when the driver/observer views the ICON in the mirror in the ON-state during vehicle operation, the individual lines in the ICON are not well-resolved (e.g.: the lines appear blended together) and the driver's eyes are focused on the more distant reflected image in the mirror.

Visual acuity or other factors may be considered for various ICON implementations and applications. For example, an estimate of the resolution limit of the unaided human eye is about 1.2 arc minute per line pair, or a 0.35 mm line pair at a viewing distance of 1 m, according to http://en.Wikipedia.org/wiki/Eye. Detection of isolated, high contrast features of smaller dimension may be achieved under certain conditions, and effectively corresponds to the line or point spread function of the natural or artificial imaging system. In any case, such information may be useful for implementing various embodiments of the present invention for use in either natural or artificial viewing systems.

Additionally, in a preferred embodiment, any unwanted diffraction, reflection, absorption or scattering of light caused by the features (or any associated proximate structure) is sufficiently low so as not to impair visibility of reflected images in the mirror. Thus, when the controlled source of active illumination is in the OFF-state, the warning ICON is not visible. Reflected images of a scene can be viewed across the full surface of the mirror, and normal viewing conditions are preserved.

The controlled source of active illumination in FIG. 1B may comprise one or more LEDs emitting at visible wavelength(s), for example red, green, blue or various combinations. In some embodiments laser diodes may be utilized if narrow bandwidth or other laser characteristics are desired. Beam 151 is illustrated as collimated, but low divergence is not a general requirement. The controlled source of illumination may include any suitable combination of bulk or integrated optics (not shown). The pattern of microscopic features may be formed by laser-based machining of the mirror 152 prior to integration into the end-user system, or at a suitable point in the mirror or vehicle fabrication process. Various methods for fabrication of the microscopic features are discussed below.

When illuminated by the LED (or any other light source) behind the mirror 152, the light emitted through the laser marks is diffracted. As discussed above, diffraction makes the lines appear much wider than they actually are, improving their visibility. Different size marks will have different diffractive effects when the LED is ON and different levels of visibility when the LED is OFF. (e.g.: "Visibility Trade-Off"). In general, increasing the mark density will increase ICON ON-state visibility, but can also increase OFF-state visibility.

In some embodiments, by machining ICON patterns using parallel raster-scanned lines, it is possible to make ICONs that are clearly visible when illuminated by LEDs behind the mirror 152. The ICONs are also nearly invisible when not illuminated, thus not obscuring the image reflected in the mirror. Such an arrangement allows for the use of larger ICONs that can be placed at almost any location on the mirror. Multiple ICONs can be put in the mirror since the larger size and positioning flexibility make the marks easier to differentiate.

Figure 1C:
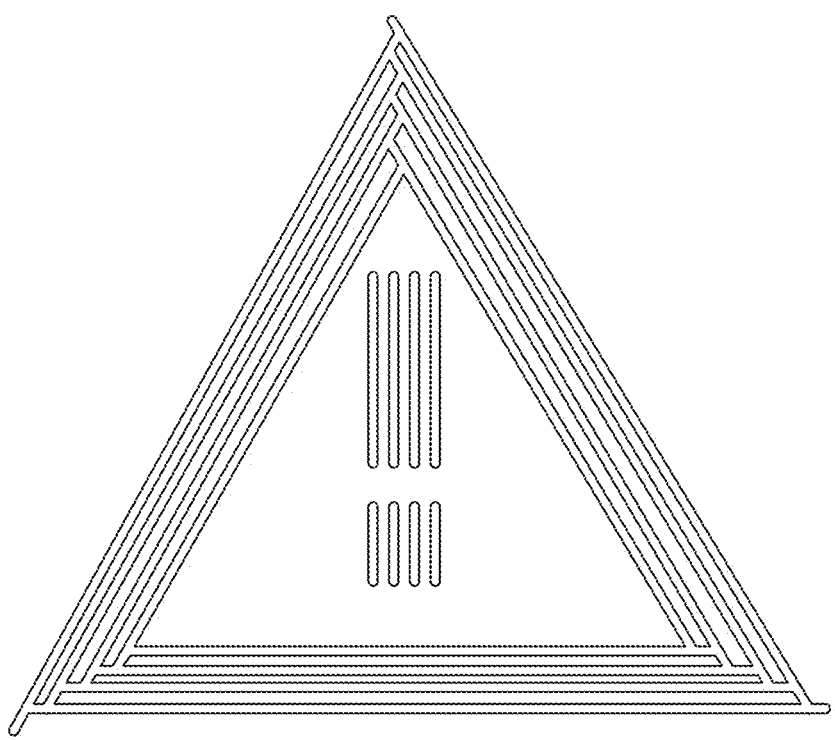
FIG. 1C schematically illustrates an example of machined features in a mirror that form an ICON suitable for use in various embodiments of the present invention.

FIG. 1C schematically illustrates an example of machined features in a mirror (top view) in the ON-state. In this example the pattern of microscopic lines corresponds to a mirror fabricated with lines about 8 μm wide and spaced by 0.5 mm. The apparent line width of about 0.2 mm is significantly wider than the machined line width. A second mirror sample was made with the same line width, but spaced by 0.25 mm. The ICON was slightly more visible when illuminated, but also more visible when not illuminated, as expected based on the visibility tradeoff. Optimal line widths and/or spacing may be determined based on application requirements. For example, in some embodiments a feature width may be in the range from about 0.5 μm to 100 μm, and the width may be constant or varying. In some embodiments a feature spacing may be in the range from about 0.1 mm to 1 mm.

In the example of FIG. 1C ICONs are made up of parallel, raster-scanned lines. However, patterns of small dots or any other suitable mark can also be used provided that the mark is sufficiently small so that it is difficult to see when the LED is OFF and is able to distribute LED light that passes through it when the LED is ON. The machined features may also be lines, arcs, circles, or other suitable shapes so as form a suitable viewing pattern when illuminated in an ON-state.

FIG. 1B illustrates some preferred elements of the display apparatus. However, it is to be understood that other optical components may be utilized, for example diffusers, attenuators, polarizing filters, collimators, reflectors, focusing elements and the like. The optical components may be in bulk or integrated form. The display apparatus may include adjustments for centering, angular adjustment of the source relative to the mirror, and the like. Such components may be utilized to improve the appearance of the ICON, enhance the contrast of the ICON relative to its background, or to otherwise control visibility in ON- or OFF-states.

Figure 1D:
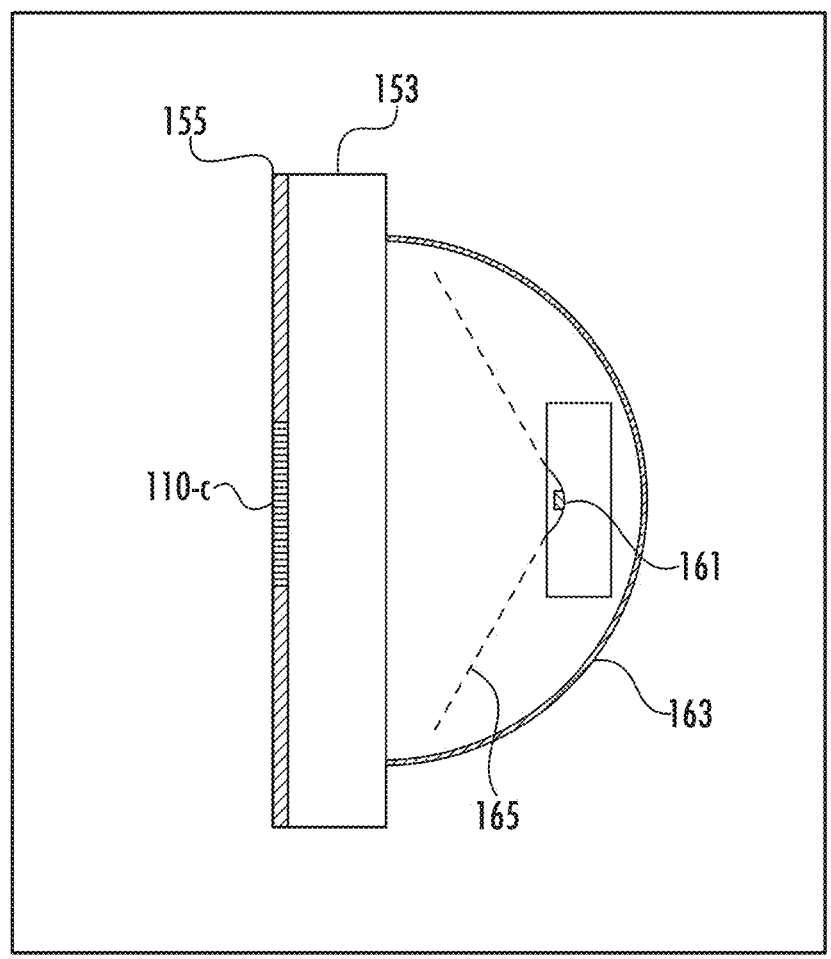
FIG. 1D schematically illustrates a reflector system to improve utilization of light energy in a display apparatus according to an embodiment of the present invention.
Figure 2A:
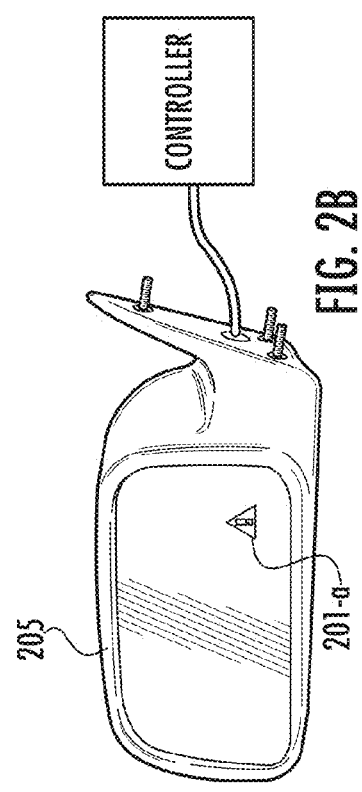
FIGS. 2A-2D schematically illustrate, under normal viewing conditions, the output of a display apparatus according to an embodiment of the present invention. The display apparatus is suitable for use in vehicle rearview mirrors. Multiple ICONs of increased size are selectively displayed in the mirror and do not impair visibility of reflected images when in the OFF-state.
Figure 2B:
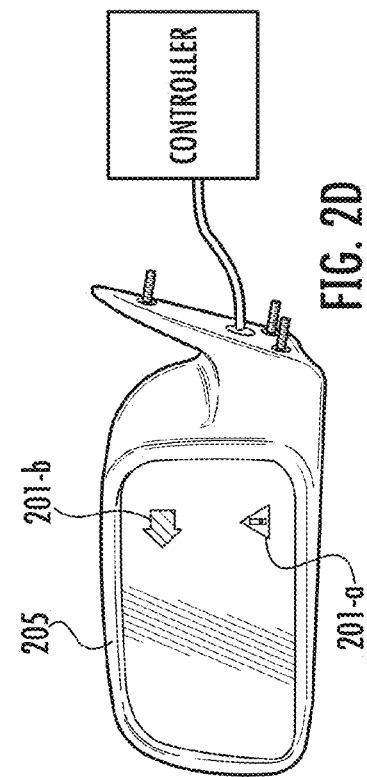
Figure 2C:
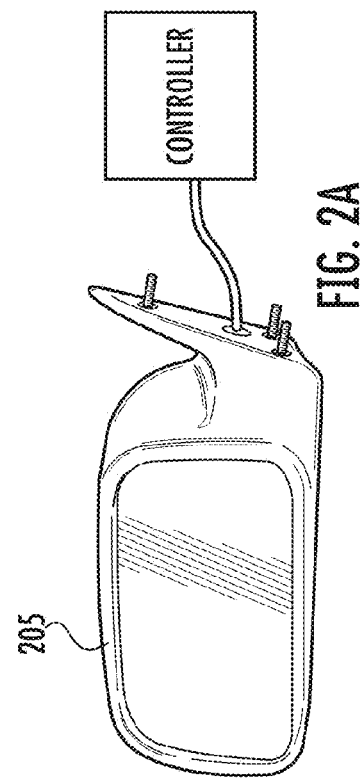
Figure 2D:
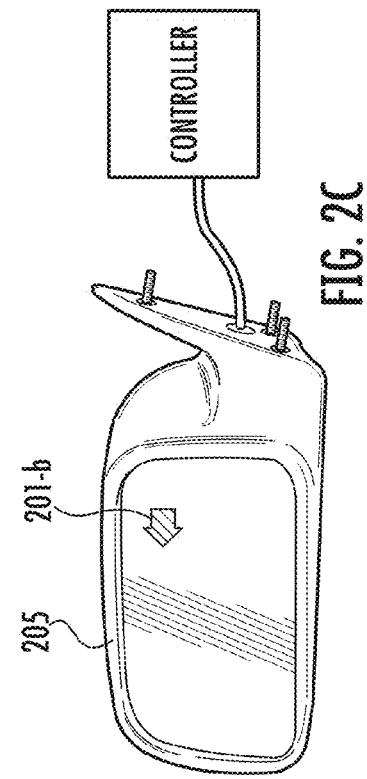

For example, FIG. 1D schematically illustrates a reflector to increase light utilization efficiency. A reflector 163 around and behind the LED chip 161 may be used to redirect light towards the ICON pattern 110-c that does not initially pass through the machined features of the ICON pattern 110-c. Because LED emission 165 can be over a large angle relative to that subtended by the ICON pattern, light reflected from reflective layer 155 and transmitted through substrate 153 can be captured by reflector 163, and at least a portion of the energy can be utilized. This reflector would more efficiently use the residual LED light, making the ICON 110-c brighter in an ON-state.

A controller of the display apparatus (not shown) may be configured as a standalone unit, or integrated with vehicle computers/control systems. In some implementations a binary control signal can be used to control the illumination during the ON-state and OFF-state. As disclosed above, in some embodiments an ON-state illumination level may be adjustable over a substantial portion of the available light range, and a controlled source of illumination may be configured for automatic light control, such as in response to the ambient light level. For example, a photodetector may be coupled to the source in a closed loop arrangement.

Various embodiments may be utilized in blind spot warning systems and other automotive applications. In such systems the reflective coating of automotive mirrors is typically not 100% reflective; as lower reflectance can reduce glare from the headlights of cars behind the driver. For example, the ratio of reflection to transmission may be 80/20 or 70/30. Consequently, it is not necessary to remove the entire thickness of the reflective layer of mirror 152 because a significant amount of the light 151 from the LED can still penetrate through the remaining thin layer of the reflective material. Also, a thin layer of a highly reflective coating will also transmit a significant amount of light. However, complete removal of the reflective layer for the lines and/or marks that make up the ICON will make the ICON brighter. In any case, the reflectivity of the mirror is not particularly important for this process.

Standard side rearview mirrors often have the reflective coating on the front surface of the mirror, but this is not a restriction. Various embodiments of the present invention can be implemented if the reflective coating is on the back surface of the mirror substrate. A transparent coating also can be applied to the mirror after machining the ICON pattern in order to prevent debris from getting into the laser-machined marks while in use and degrading the ICON pattern.

FIGS. 2A-2D schematically illustrate, under a normal viewing condition, the output of a display apparatus according to an embodiment of the present invention. The display apparatus is suitable for use in a vehicle rearview mirror. Multiple ICONs of increased size are selectively displayed and do not impair visibility of reflected images when in the OFF-state. In this example two relatively large ICONs are utilized as indicators and, in this example, illustrated with the four possible binary ON and OFF states, with ON states of the triangular and arrow ICONs 201-a and 201-b respectively. However, the invention is not so restricted, and may be extended to gray scale or color operation with suitable modifications of the source and controller. For example, an ICON may be displayed with different colors and/or ON/OFF rates that are representative of hazard levels or other signaling conditions.

Figure 3:
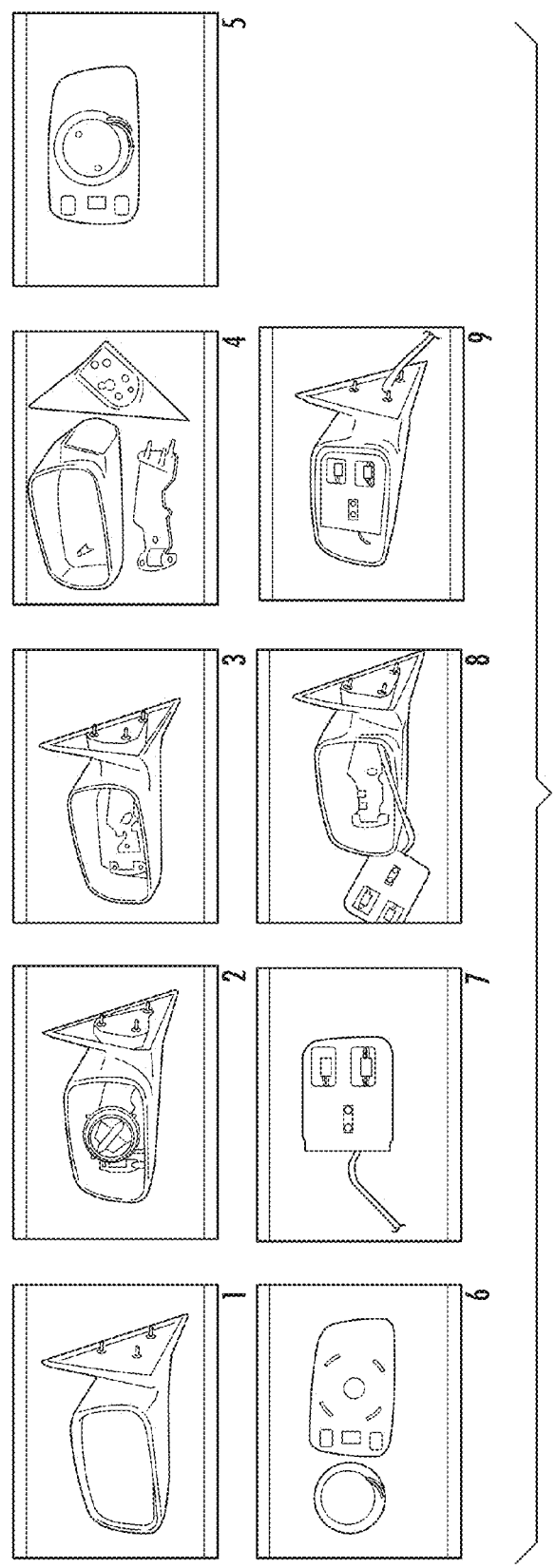
FIG. 3 schematically illustrates portions of an automotive mirror assembly configured with a display apparatus according to an embodiment of the present invention.

FIG. 3 schematically illustrates portions of an automotive mirror assembly configured with a display apparatus according to an embodiment of the present invention.

1: Mirror assembly.
2: Mirror assembly with the mirror and mirror frame removed, showing the power-mirror adjustment motors.
3: Mirror assembly with the mirror, mirror frame and motors removed.
4: Disassembled parts in #3.
5: Back side of the mirror, mirror frame and motor assembly.
6: Motor assembly removed from mirror frame.
7: LED housing with two LED modules mounted.
8: LED housing and mirror assembly without the mirror.
9: LED housing mounted in the mirror assembly without the mirror.

Thus, various implementations of the present invention may be integrated into existing vehicle hardware.

Similarly, numerous possibilities exist for application of embodiments of the present invention, some of which are discussed below:

For example, some implementations may provide patterned illumination. In various examples above, the ICON is formed based on a pattern written in the reflective layer of the mirror. A uniform illumination source behind the mirror may be used to display the ICON. Another option is to create the ICON pattern using an LED array or other configurable light source, such as in conventional mirror displays, or perhaps an LCD.

FIG. 4A schematically illustrates, under normal viewing conditions, the appearance of a prior rearview mirror indicator region with illumination in the ON- and OFF-states. A portion of the mirror surface is removed from the region around the ICON. This example is similar to various indicators used in automotive rearview mirrors, for example a compass indicator. When the ICON is ON (405-a) the triangular shaped symbol is visible on the modified background with reduced reflectance. When the ICON is OFF (405-*b*) the region of the mirror where the reflective layer has been removed is clearly visible. The corresponding area of the mirror is lost.

An output of a display apparatus according to an embodiment of the present invention is illustrated in FIG. 4B, showing the appearance of the mirror region in ON- and OFF-states, 410-*a* and 410-*b* respectively.

Some implementations of the present invention may provide for incremental warnings based on color. An RGB LED may be used as a controlled source disposed behind the mirror. The arrangement can be used to illuminate the ICON with a range of colors, based on the warning level or other variable data. A hazard ICON with different colors may be generated with modifications of the controller and optics. An example scenario can be the following:

WHITE: flash to show the system is operational;
YELLOW: obstacle is approaching, but not yet a hazard;
ORANGE: obstacle is still getting closer;
RED: danger!

The ICON design may, for example, be similar to that of FIG. 1C.

Some implementations may provide for Location-Specific Warning signals based on the location of the particular ICON in the mirror. Because the ICONs written by femtosecond lasers do not affect the image reflected in the mirror when the LEDs are OFF, different ICONs can be placed in different areas of the mirror that can be associated with different types of warnings, also with different colors.

Some implementations may provide large ICONs. Because the ICONs written by femtosecond lasers do not affect the image reflected in the mirror when the LEDs are OFF, large ICONs can be used that cover a significant portion of the mirror. However, when the ICONs are ON, the images in the mirror may be obscured. The brightness of the illumination can be controlled to balance the visibility of the ICON under the current ambient conditions with the visibility of the reflected image in the mirror, based on an ambient light sensor.

Some implementations may be applied to vehicle passenger-side rearview mirror and/or inside rearview mirror arrangements. ICONs can also be machined in passenger-side rearview mirrors. Depending on mirror parameters the laser machining process may be modified. For example, a curved mirror may require 3D positioning of the beam and/or power adjustments.

Some implementations may provide for direct replacement of commercially available systems (after-market systems) where the blind spot monitoring function is fully self-contained with the ICONs displayed in the mirror, a CCD camera or other sensor mounted to the mirror assembly and a controller in the mirror assembly or mounted nearby inside the car.

Non-Warning Displays may be implemented, for ICONs or other types of displays, such as for consumer electronics and home or industrial equipment, where there is some design or performance benefit, such as brand-uniqueness, to make the display only visible at specific instances and invisible at other times.

Some implementations may be utilized for non-mirror based displays. Femtosecond laser machining can be utilized to form microscopic marks in a thin opaque or semi-opaque film on any transparent substrate for various display applications.

Methods and systems for forming the microscopic features may utilize laser based or other suitable technologies. A preferred laser-based processing method used to form microscopic features utilizes ultrashort laser technology. U.S. patent application Ser. No. 12/641,256, entitled "Laser-based material processing methods and systems", filed Dec. 17, 2009 discloses, among other things, processing of semiconductor substrates having metal, dielectric, and semiconductor materials. The '256 application is hereby incorporated by reference in its entirety. U.S. patent application Ser. No. 12/397,567, ('567), entitled "Transparent material processing with an ultrashort pulse laser", filed Mar. 4, 2009, now US patent Application Pub. No. 2010/0025387, is hereby incorporated by reference in its entirety. The '567 application describes various ultrashort pulse laser machining applications and teaches, among other things, the formation of subsurface marks which are rendered clearly visible with controlled illumination and are essentially invisible in ambient light.

Figure 5A:
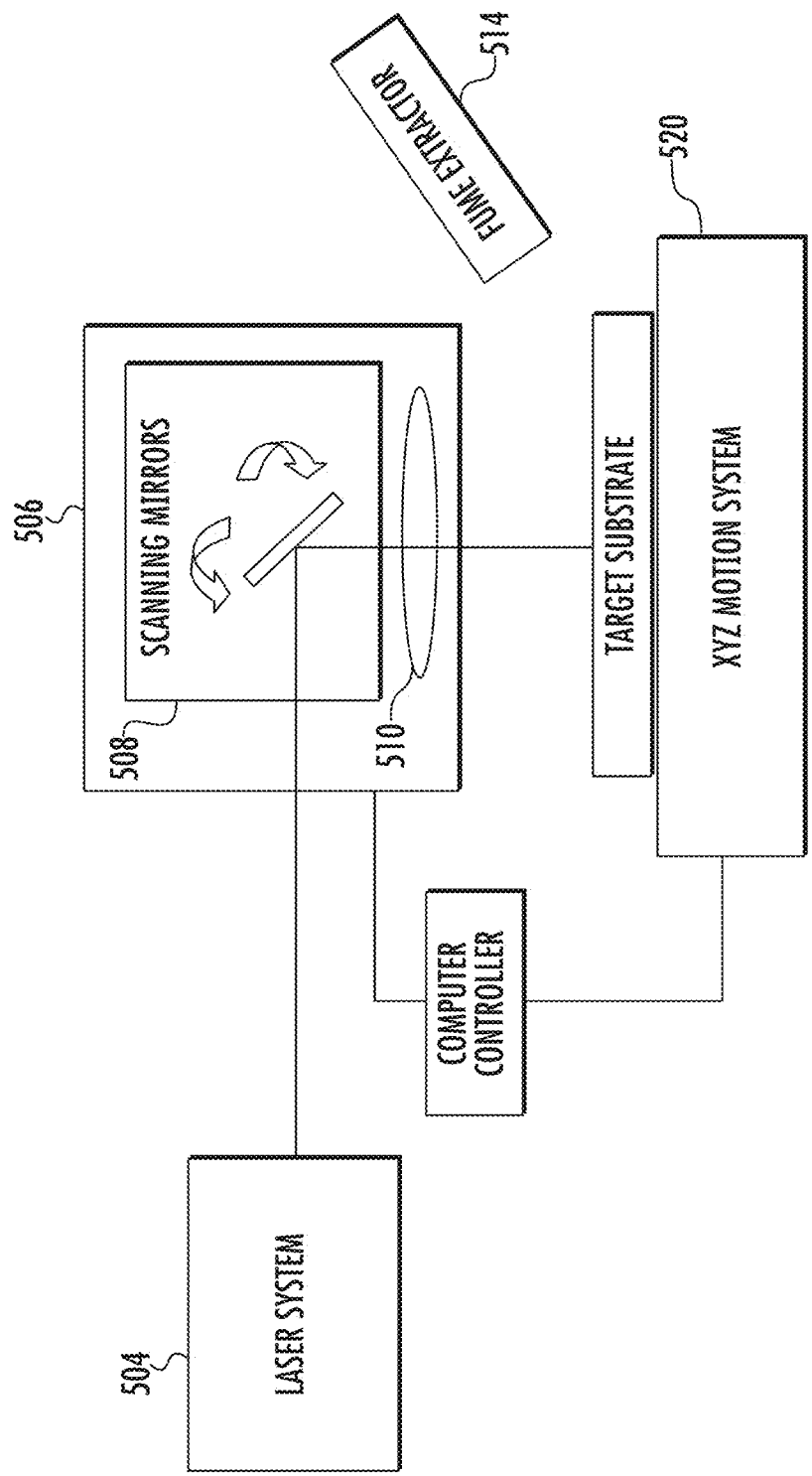
FIG. 5A schematically illustrates an exemplary system for forming machined features on the mirror with an ultrashort pulse laser-based system to remove a portion of an existing mirror coating, the features being arranged so as to form an ICON and distribute incident energy so as to display the ICON when in an ON-state.

FIG. 5A schematically illustrates an exemplary system for forming machined features on a mirror with the use of an ultrashort laser-based system to remove a portion of an existing mirror coating, the features being arranged so as to form an ICON and distribute incident energy so as to display the ICON.

FIG. 5A illustrates some components used for ultrashort laser processing: The system comprises a laser system 504 that is operatively coupled to a controller and scanning system 506. In some embodiments, the laser system 504 is configured to output laser pulses that comprise one or more ultrashort pulses (USP). In some implementations the USP laser comprises a fiber-based chirped pulse amplification system that generates fs pulses with energy exceeding 1 µJ, at a repetition rate of 100 KHz or greater. Such fiber based systems are commercially available from IMRA America Inc. In various embodiments the USP system will provide for adjustment of certain pulse parameters over a substantial range. In this embodiment, the scanning system 506 includes two beam deflectors 508, for example galvanometric scanning mirrors, capable of two-dimensional scanning. In other embodiments, a different number and/or type of scanning mirrors may be used. In some embodiments, the scanning may be one-dimensional. The scanning system 506 may also include focusing optics 510 such as, for example, an integrated F-theta lens capable of producing a substantially flat field of view at the target substrate. An optional motion system 520 may position the substrate in three-dimensions, and may further provide mechanism(s) for rotation of the substrate (e.g.: roll, pitch, and yaw). In some embodiments the substrate may be processed during motion of the stage. An optional fume extractor 514 may be included to capture any debris.

Figure 5B:
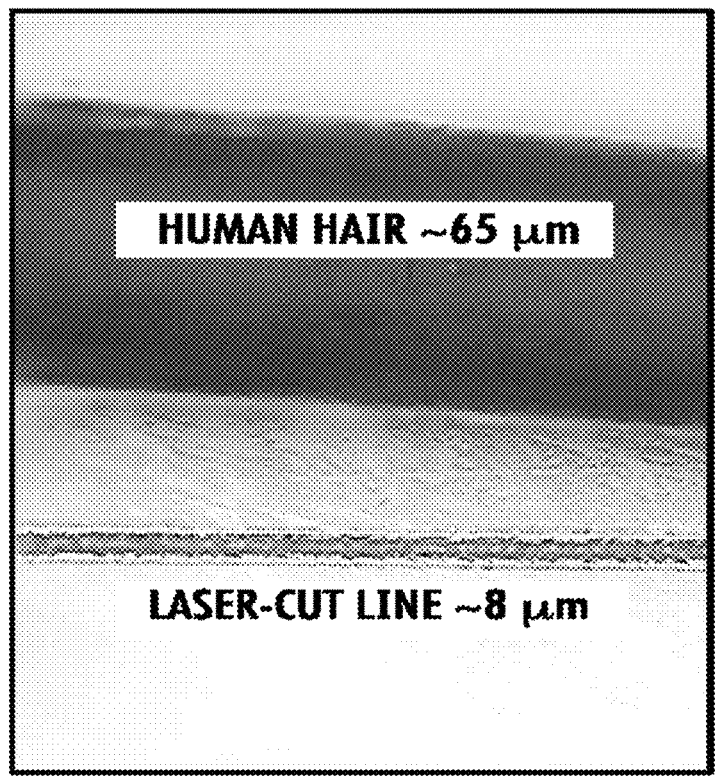
FIG. 5B is a gray scale image showing a laser line machined with a femtosecond laser and compared with the width of a human hair for scale.

An ultrashort laser system was used to form microscopic features as shown in FIG. 1C. The mirror comprises a reflective mirror coating deposited on a glass substrate. The lines machined by the femtosecond laser were about 8 µm wide. When not illuminated, these marks are very difficult to see with the unaided eye because they are so small. By way of example, FIG. 5B is a gray scale microscope image showing a laser line machined with a femtosecond laser and compared with the width of a human hair. The human hair is about 65 µm in diameter. The following laser parameters were utilized:

Laser: FCPA µJewel D-1000 (IMRA America)
Repetition rate: 100 kHz
Wavelength: 1045 nm
Average power: 450 mW
Pulse duration: ~500 fs
Focusing lens: 20× aspheric lens
Focus position: at mirror surface
Translation speed: 50 mm/s A shutter was opened after the translation stage accelerated to speed and closed before the translation stage started to slow down, with the open and close stage positions determined by the desired ICON pattern. All lines were written in one direction; the shutter was closed during the reverse direction. All lines were written with a single pass. A second pass was found to machine the surface of the glass substrate.

In various implementations other focusing conditions, translation speeds and laser parameters may be utilized. For example, repetition rates exceeding 1 MHz, other visible or near IR wavelengths, and/or pulse widths from about 100 fs to about 10 ps may be utilized.

Mask machining could reduce the processing time. By way of example, U.S. patent application Ser. No. 12/970,187, entitled "Laser patterning using a structured optical element and a focused beam" filed Dec. 16, 2010, is hereby incorporated by reference in its entirety. The '187 application discloses, for example, a structured optical element that blocks, scatters or significantly attenuates the laser light in the regions where no laser machining, modification or exposure on the target is desired, while transmitting the laser light in regions where laser machining, modification or exposure on the target is desired ICONs may be formed with various optical materials. Any transparent mirror substrate, such as glass or plastic, with a reflective film can be used. With femtosecond laser machining, it is possible to remove the reflective coating of the mirror with minimal damage to the transparent substrate. This makes the ICON brighter and sharper when illuminated. If the substrate is damaged during the laser machining process, the light from the LED will scatter due to the roughness of the laser damaged surface. Ambient light will also scatter from the rough surface, rather than reflect, making the ICON more visible when the LED is OFF. If a plastic or polymer substrate is used, minimizing heat when machining the reflective coating of the mirror can avoid damaging the substrate, and is to be considered.

An advantage of femtosecond laser machining is that minimal thermal energy is conducted to the material surrounding the line. Therefore, there is minimal or no melted or oxidized region along the laser-machined mark, as would typically be the case with long-pulse laser machining Melted or oxidized material in the reflected coating of the mirror will make the lines or marks appear to be wider when the LED is off while not permitting any additional light through to the viewer when the LED is ON.

Although ultrashort laser machining provides advantages, for example a small heat-affected zone and low debris, other methods may be used for making ICONs composed of microscopic lines or other mark. Such methods include wet etching, mechanical scribing and long pulse laser machining. Mechanical scribing may produce less-uniform line widths since the scribe tip will wear over time. The edges of the lines may not be as smooth and microscopic line widths may be challenging. EDM (electrical discharge machining) is also possible, but the process speed will be much slower than laser machining Wet chemical etching requires more steps and the use of corrosive chemicals that are not environmentally-friendly. Nevertheless, the performance requirement of applications can vary and various alternatives may be suitable based on cost/performance or similar criteria.

At least one embodiment of an optical signaling apparatus includes a controllable first source of illumination capable of providing ON and OFF illumination states. An optical medium is arranged to receive illumination from the controllable first source and is capable of receiving illumination from a second source. A region of the medium is arranged in such a way that a detectable optical signal is visible therefrom during an illumination ON state of the controllable first source. The region of the medium is essentially indistinguishable from other parts of the medium during an OFF illumination state of said controllable first source, notwithstanding the arrangement of the region.

In some embodiments a region of the medium forms an image with the illumination from the second source.

In some embodiments the region of the optical medium comprises microscopic features formed in the medium, and the microscopic features distribute energy from the controllable first source over a viewing angle so as to form the detectable optical signal.

In some embodiments the optical medium comprises a transparent or translucent substrate with a thin, opaque or semi-opaque film.

In some embodiments the optical medium comprises a mirror, the mirror comprising a transparent substrate and a reflective coating disposed thereon.

In some embodiments the optical medium comprises a mirror, the mirror comprising a transparent substrate and a reflective coating disposed thereon, and the region comprises microscopic features that substantially diffract energy received from the controllable first source in an ON state to generate the optical signal, and the microscopic features are sufficiently small to be nearly invisible when the controllable first source is in the OFF state.

In some embodiments energy is diffracted over a full angle of at least about 10 degrees.

In some embodiments the microscopic features are formed by selectively removing a depth-wise portion of the reflective coating.

In some embodiments the controllable first source comprises at least one LED.

In some embodiments the controllable first source comprises an RGB LED source.

In some embodiments the second illumination source emits natural illumination.

In some embodiments the second illumination source emits energy from an artificial source of illumination.

In some embodiments a portion of illumination from the controlled first source is incident on the region of medium from first directions, and at least a portion of illumination from second source is incident from second directions that overlap the first direction.

In some embodiments the apparatus is configured as a portion of a warning system of a vehicle, and the optical signal is in the form of an ICON.

At least one embodiment includes a laser-based method. The method includes irradiating a portion of an optical medium with laser pulses to selectively remove at least a depth-wise portion of material from a region of the medium, and to form a predetermined pattern of microscopic features. The microscopic features are arranged in such a way that a detectable optical signal is visible therefrom with illumination from a first source. The medium is capable of receiving incident illumination from a second source. The region of the medium is essentially indistinguishable from other parts of the medium without illumination from the first source, notwithstanding the arrangement of the region.

In some embodiments the optical medium comprises a transparent or translucent substrate with a thin, opaque or semi-opaque film.

In some embodiments the optical medium comprises a mirror, the mirror comprising a transparent substrate and a reflective coating disposed thereon.

In some embodiments the optical medium includes a mirror, the mirror having a transparent substrate and a reflective coating disposed thereon, and the region comprises microscopic features that substantially diffract energy received from the controllable first source to generate the detectable signal, and the microscopic features are sufficiently small to be nearly invisible when the first source is in the OFF state.

In some embodiments the microscopic features are formed by selectively removing a depth-wise portion of the reflective coating.

In some embodiments ultrashort pulses are generated, the ultrashort pulses having a pulse width in the range from about 100 fs to about 10 ps.

In some embodiments the laser pulses are generated at a repetition rage of at least about 1 KHz.

In some embodiments the laser pulses are generated at a repetition rate of at least about 100 KHz.

At least one embodiment includes of modifying a portion of an optical medium to selectively remove at least a depth-wise portion of material from a region of the medium, and to form a predetermined pattern of microscopic features. The features are arranged in such a way that a detectable optical signal is visible therefrom with illumination from a first source. The medium is capable of receiving illumination from a second source. The region of the medium is essentially indistinguishable from other parts of the medium without illumination from the first source, notwithstanding the arrangement of the region.

In some embodiments the method comprises mechanically scribing or etching.

At least one embodiment includes an optical signaling method. The method includes controlling a first source of illumination capable of providing ON and OFF illumination states. The method includes utilizing an optical medium to receive illumination from the first source and to receive illumination from a second source. A region of the medium is arranged in such a way that a detectable optical signal is visible therefrom during an illumination ON state of the first source. The region of the medium is essentially indistinguishable from other parts of the medium during an OFF illumination state of the first source, notwithstanding the arrangement of the region.

In some embodiments the optical signaling method provides a warning indication for use during movement.

At least one embodiment includes a visual warning system. The system comprises a controllable first source of illumination capable of providing ON and OFF illumination states. A mirror is arranged to receive illumination from the controllable first source and is capable of receiving illumination from a second source different than the first source. A region of the mirror comprises microscopic features that distribute energy from said controllable first source over a viewing angle so as to form an optical signal visible therefrom during an illumination ON state of said controllable first source. The detectable optical signal is in the form of an ICON comprising a symbol, shape, or other image-like representation. The region containing the microscopic features appears essentially the same as or indistinguishable from the remainder of the mirror surface during an OFF illumination state of said controllable first source, notwithstanding the arrangement of the region of microscopic features. Thus the microscopic features are essentially invisible to an observer in the OFF illumination state. This region of the mirror forms a portion of the visible mirror image with illumination from said second source.

At least one embodiment includes a visual warning system. The system includes a controllable first source of illumination capable of providing ON and OFF illumination states. A mirror is arranged to receive illumination from the controllable first source and is capable of receiving illumination from a second source different than the first source. A region of the mirror comprises microscopic features that distribute energy from the controllable first source over a viewing angle so as to form an optical signal visible therefrom during an illumination ON state of said controllable first source. The visible optical signal is in the form of an ICON comprising a symbol, shape, or other image-like representation. The ICON is essentially invisible during an OFF illumination state of the controllable first source, notwithstanding the arrangement of the region of microscopic features and a presence of illumination from said second source on or within the region. The region of said mirror forms a portion of a visible mirror image with illumination from the second source.

A visual warning may include a plurality of ICONs and a corresponding plurality of controllable sources of illumination. The ICONs may comprise at least two different shapes or symbols.

While only certain embodiments have been specifically described herein, it will be apparent that numerous modifications may be made thereto without departing from the spirit and scope of the invention. It is to be understood that embodiments and associated features are not to be construed as exclusive, and such features and embodiments may be combined in various implementations. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. An optical signaling apparatus, comprising:
    a controllable first source of illumination capable of providing ON and OFF illumination states; and
    an optical medium arranged to receive illumination from said controllable first source and capable of receiving illumination from a second source, wherein a region of said medium is arranged in such a way that a detectable optical signal is visible therefrom during an illumination ON state of said controllable first source, and wherein said region of said medium is essentially indistinguishable from other parts of the medium during an OFF illumination state of said controllable first source, notwithstanding the arrangement of said region,
    wherein said region of said optical medium comprises microscopic features formed in said medium, said microscopic features having a size in the range from about 0.5 µm to about 100 µm, said microscopic features being substantially absent of any melted or oxidized region therealong, to increase the visibility of the optical signal in said ON-state, and wherein said microscopic features are formed with ultrashort laser pulses.

2. The optical signaling apparatus of claim 1, wherein said region of said medium forms an image with said illumination from said second source.

3. The optical signaling apparatus of claim 1, wherein said microscopic features distribute energy from said controllable first source over a viewing angle so as to form said detectable optical signal.

4. The optical signaling apparatus of claim 1, wherein said optical medium comprises a mirror, the mirror comprising a transparent substrate and a reflective coating disposed thereon, said microscopic features formed in said medium by selective removal of a depth-wise portion of the reflective coating.

5. The optical signaling apparatus of claim 1, wherein said microscopic features substantially diffract energy received from said controllable first source in an ON state to generate said optical signal, and said microscopic features are sufficiently small to be nearly invisible when said controllable first source is in the OFF state.

6. The optical signaling device of claim 5, wherein energy is diffracted over a full angle of at least about 10 degrees.

7. The optical signaling apparatus of claim 1, wherein said second illumination source emits natural illumination.

8. The optical signaling apparatus of claim 1, wherein said second illumination source emits energy from an artificial source of illumination.

9. The optical signaling apparatus of claim 1, wherein a portion of illumination from the controlled first source is incident on the region of medium from first directions, and at least a portion of illumination from second source is incident from second directions that overlap the first directions.

10. The optical signaling apparatus of claim 1, wherein said apparatus is configured as a portion of a warning system of a vehicle, and said optical signal is in the form of an ICON.

11. An optical signaling method, comprising:
controlling a first source of illumination capable of providing ON and OFF illumination states; and
utilizing an optical medium arranged with microscopic features formed therein to receive illumination from said first source and to receive illumination from a second source, said microscopic features having a size in the range from about 0.5 μm to about 100 μm,
wherein a region of said medium is arranged in such a way that a detectable optical signal is visible therefrom during an illumination ON state of said first source, and wherein said region of said medium is essentially indistinguishable from other parts of the medium during an OFF illumination state of said first source, notwithstanding the arrangement of said region, said microscopic features being substantially absent of any melted or oxidized region therealong, to increase the visibility of the optical signal in said ON-state, and wherein said microscopic features are formed with ultrashort laser pulses.

12. The optical signaling method of claim 11, wherein said method provides a warning indication for use during movement.

13. A visual warning system, comprising:
a controllable first source of illumination capable of providing ON and OFF illumination states; and
an optical medium arranged to receive illumination from said controllable first source and capable of receiving illumination from a second source different than the first source, wherein a region of said optical medium comprises microscopic features that distribute energy from said controllable first source over a viewing angle so as to form an optical signal visible therefrom during an illumination ON state of said controllable first source, wherein said visible optical signal is in the form of an ICON comprising a symbol, shape, or other image-like representation, and wherein said region of said optical medium is essentially indistinguishable from other parts of the optical medium during an OFF illumination state of said controllable first source, notwithstanding the arrangement of said region of microscopic features, wherein said region of said optical medium forms a portion of a visible image obtainable with said illumination from said second source,
wherein said optical medium comprises a transparent or translucent substrate and a reflective coating disposed thereon, wherein said region of said optical medium comprises said microscopic features formed in said medium by selective removal of a depth-wise portion of the reflective coating, said microscopic features having a size in the range from about 0.5 μm to about 100 μm, said microscopic features being substantially absent of any melted or oxidized region therealong, and having a small laser induced heat-affected zone, to increase the visibility of the optical signal in said ON-state, and wherein said microscopic features are formed with ultrashort laser pulses.

14. The visual warning system of claim 13, wherein said system comprises a plurality of ICONs and a corresponding plurality of controllable sources of illumination, said ICONs comprising at least two different shapes or symbols.

15. The optical signaling apparatus of claim 1, wherein said apparatus comprises a plurality of ICONs and a corresponding plurality of controllable sources of illumination, said ICONs comprising at least two different shapes or symbols.

16. The optical signaling apparatus of claim 1, wherein said microscopic features comprise dots, lines, arcs, or circles.

17. The optical signaling apparatus of claim 1, wherein said apparatus is configured in a vehicle, and visibility is characterized relative to a resolution limit of a human eye.

18. The optical signaling apparatus of claim 1, wherein visibility is characterized relative to a resolution limit of an imaging device.

19. The optical signaling apparatus of claim 1, wherein said optical medium comprises a non-mirror medium.

20. The optical signaling apparatus of claim 19, wherein said non-mirror medium comprises a transparent or translucent substrate having an opaque or semi-opaque film disposed thereon.

21. The visual warning system of claim 13, wherein said microscopic features comprise dots, lines, arcs, or circles.

22. The visual warning system of claim 13, wherein said system is configured in a vehicle, and visibility is characterized relative to a resolution limit of a human eye.

23. The visual warning system of claim 13, wherein visibility is characterized relative to a resolution limit of an imaging device.

24. The optical signaling apparatus of claim 1, wherein said microscopic features in said medium are formed with an ultrashort pulse laser providing a pulse width in the range from about 100 fs to about 10 ps.

25. The visual warning system of claim 13, wherein said microscopic features in said medium are formed with an ultrashort pulse laser providing a pulse width in the range from about 100 fs to about 10 ps.

26. The optical signaling method of claim 11, wherein said microscopic features in said medium are formed with an ultrashort pulse laser providing a pulse width in the range from about 100 fs to about 10 ps.

27. The optical signaling apparatus of claim 1, wherein said melted or oxidized region is a laser induced heat affected zone along said microscopic features.

28. The visual warning system of claim 13, wherein said heat affected zone is characterized by said melted or oxidized region along said microscopic features.

29. The optical signaling method of claim 11, wherein said melted or oxidized region is a laser induced heat affected zone formed along said microscopic features.

30. The optical signaling apparatus of claim 1, wherein said optical medium comprises a transparent substrate and a reflective optical coating disposed thereon, wherein said coating is disposed on a front surface of said substrate, said front surface being located on an opposite side of said substrate relative to the position of said first source, and located in an optical path of said first source, arranged in such a way that light energy from said first source passes through the substrate to impinge said microscopic features and said optical coating.

31. The visual warning system of claim 13, wherein said optical medium comprises a transparent substrate and a reflective optical coating disposed thereon, wherein said coating is disposed on a front surface of said substrate, said front surface being located on an opposite side of said substrate relative to the position of said first source, and located in an optical path of said first source, arranged in such a way that light energy from said first source passes through the substrate to impinge said microscopic features and said optical coating.

32. The optical signaling method of claim 11, wherein said optical medium comprises a transparent substrate and a reflective optical coating disposed thereon, wherein said coating is disposed on a front surface of said substrate, said front surface being located on an opposite side of said substrate relative to the position of said first source, and located in an optical path of said first source, arranged in such a way that light energy from said first source passes through the substrate to impinge said microscopic features and said optical coating.

* * * * *